US012806592B2

(12) United States Patent
Abbaspourrad et al.

(10) Patent No.: US 12,806,592 B2
(45) Date of Patent: Nov. 24, 2026

(54) MICROENCAPSULATION METHOD USING AMPHIPHILIC POLYMERS

(71) Applicant: Cornell University, Ithaca, NY (US)

(72) Inventors: Alireza Abbaspourrad, Ithaca, NY (US); Min Nie, Ithaca, NY (US)

(73) Assignee: Cornell University, Ithaca, NY (US)

( * ) Notice: Subject to any disclaimer, the term of this patent is extended or adjusted under 35 U.S.C. 154(b) by 690 days.

(21) Appl. No.: 18/166,269

(22) Filed: Feb. 8, 2023

(65) Prior Publication Data

US 2023/0249148 A1 Aug. 10, 2023

Related U.S. Application Data

(60) Provisional application No. 63/307,985, filed on Feb. 8, 2022.

(51) Int. Cl.
*B01J 13/14* (2006.01)

(52) U.S. Cl.
CPC .................................... *B01J 13/14* (2013.01)

(58) Field of Classification Search
None
See application file for complete search history.

(56) References Cited

U.S. PATENT DOCUMENTS

2022/0105487 A1* 4/2022 Strobel ................ A61K 9/5036
2022/0211092 A1* 7/2022 Arafat Arafat .......... B01J 13/02

OTHER PUBLICATIONS

Synthesis and Characterization of octenyl succinic anhydride modified starches for food Applications. A review of recent literature. (Year: 2017).*

* cited by examiner

*Primary Examiner* — Jeffrey D Washville
(74) *Attorney, Agent, or Firm* — Hodgson Russ LLP

(57) ABSTRACT

Provided are microcapsules. The microcapsules are oil-in-water microcapsules where an oil or oil-based material is encapsulated by a shell. The shell comprises an amphiphilic polymers units. Also provided are amphipathic polymer units and methods of preparing microcapsules of the present disclosure and compositions comprising microcapsules of the present disclosure. The amphiphilic polymer units may have the following structure:

(STRUCTURE I)

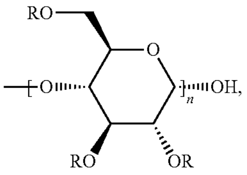

where each R is independently H or (STRUCTURE IA)

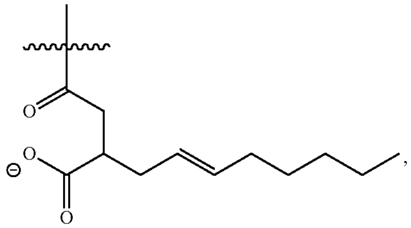

where at least one R of a glucosyl group of the polysaccharide is STRUCTURE IA.

20 Claims, 10 Drawing Sheets

MICROENCAPSULATION METHOD USING AMPHIPHILIC POLYMERS

CROSS REFERENCE TO RELATED APPLICATIONS

This reference claims priority to U.S. Provisional Application No. 63/307,985, filed on Feb. 8, 2022, the disclosure of which is incorporated herein by reference.

BACKGROUND OF THE DISCLOSURE

Microencapsulation techniques have been widely studied in industry for the preservation and controlled release of ingredients in food, agrochemicals, cosmetics, and pharmaceuticals. In the past decades, several methods have been developed to accommodate various encapsulation applications. In general, microcapsule systems use a polymer shell created through certain mechanism to protect the core material from being affected by the environment, then release the material under designated conditions. To encapsulate oil-based core materials, a microemulsion system is often used. Current microencapsulation methods include sol-gel method, interfacial polymerization method, complex coacervation method, etc.

However, one challenge present in the current microencapsulation processes for commercial products is that the use of non-biodegradable polymers as wall materials can create microplastic pollution, which may have a long-term impact on natural ecosystems. As a result, in recent years there has been increasing interest in using biodegradable polymers in microencapsulation systems. Among them, the polymers originated from the natural source are of particular interest. For example, gum Arabic and chitosan have been used to encapsulate triglycerides by the coacervation of the two natural polymers at the oil-water interface. Regenerated silk fibroin has also been used in aqueous solution to encapsulate fragrance by direct electrospraying. These methods have shown that natural polymers have high potential in making biodegradable microcapsules. However, different microencapsulation methods are developed based on the different requirements for various core materials. All the factors such as polarity, thermal stability, solubility, pH condition etc. need to be taken into consideration. To accommodate different conditions of encapsulating various core materials, there is a demand to explore more alternative approaches.

In recent years, alginate, a natural polysaccharide, has been used for microencapsulation because its unique polyanion structure in water that can enable a sol-gel transition to solidify the polymer from the solution. The process uses divalent cations such as calcium ions to react and create ionic bonds with the anions of the polymer chains to form the crosslinked shell. However, alginate is not able to spontaneously aggregate near the surface of the core material. To concentrate the polymer near the surface of the core and obtain the desired size of microcapsules, it usually requires a small nozzle extrusion setup or a droplet dispersion of polymer solution in W/O emulsion which consumes a large amount of oil as the continuous phase. On the other side, amphiphilic polymers containing both hydrophilic and hydrophobic parts in the structure can form micelles that are often used for delivering water-insoluble drugs, where the structure can spontaneously encapsulate the core in water and disassemble to release drugs under environmental changes (e.g. pH variations). However, micelles are not stable microcapsules as they are easy to collapse when the water is removed. To use the amphiphilic polymers to create stable microcapsules that can be separated from the media, a hardening/crosslinking process is necessary.

SUMMARY OF THE DISCLOSURE

In an aspect, the present disclosure provides amphiphilic polymer units. The amphiphilic polymer units comprise a polysaccharide (e.g., maltodextrin) and one or more aliphatic groups having one or more carboxylate groups.

The amphiphilic polymer units of the present disclosure have the following structure:

(STRUCTURE I)

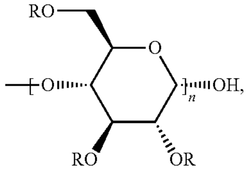

where each R is independently H or (STRUCTURE IA)

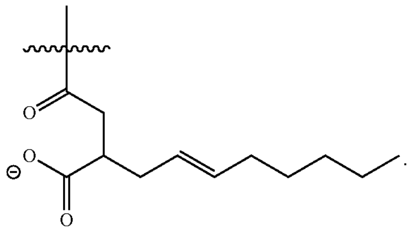

At least one R of a glucosyl group of the polysaccharide is STRUCTURE IA, where n 2 to 20, including all integer values and ranges therebetween. Although STRUCTURE I is depicted as having an alpha linkage, the polysaccharide may have beta linkages. Thus, in an example, the polysaccharide may have all alpha linkages, all beta linkages, or a combination thereof. In various examples, the polysaccharide has the following structure:

(STRUCTURE II)

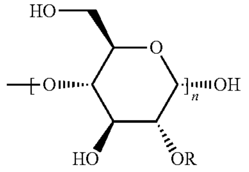

or (STRUCTURE III)

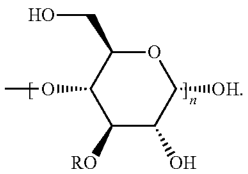

In an aspect, the present disclosure provides compositions. The compositions comprise the microcapsules of the present disclosure. In various examples, the composition comprises a carrier. The carrier may be an aqueous carrier.

In an aspect, the present disclosure provides articles. The articles may comprise a microcapsule of the present disclosure or a composition of the present disclosure. The articles may be laundry softeners, cosmetic products, agrochemical products, and the like. For example, the articles may comprise microcapsules comprising fragrance oils in laundry softeners or cosmetics. In other examples, agrochemical articles may comprises microcapsules encapsulating agricultural chemicals.

In an aspect, the present disclosure provides methods encapsulating an oil or an oil-based material with a plurality of ionically-crosslinked amphiphilic polymer units.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
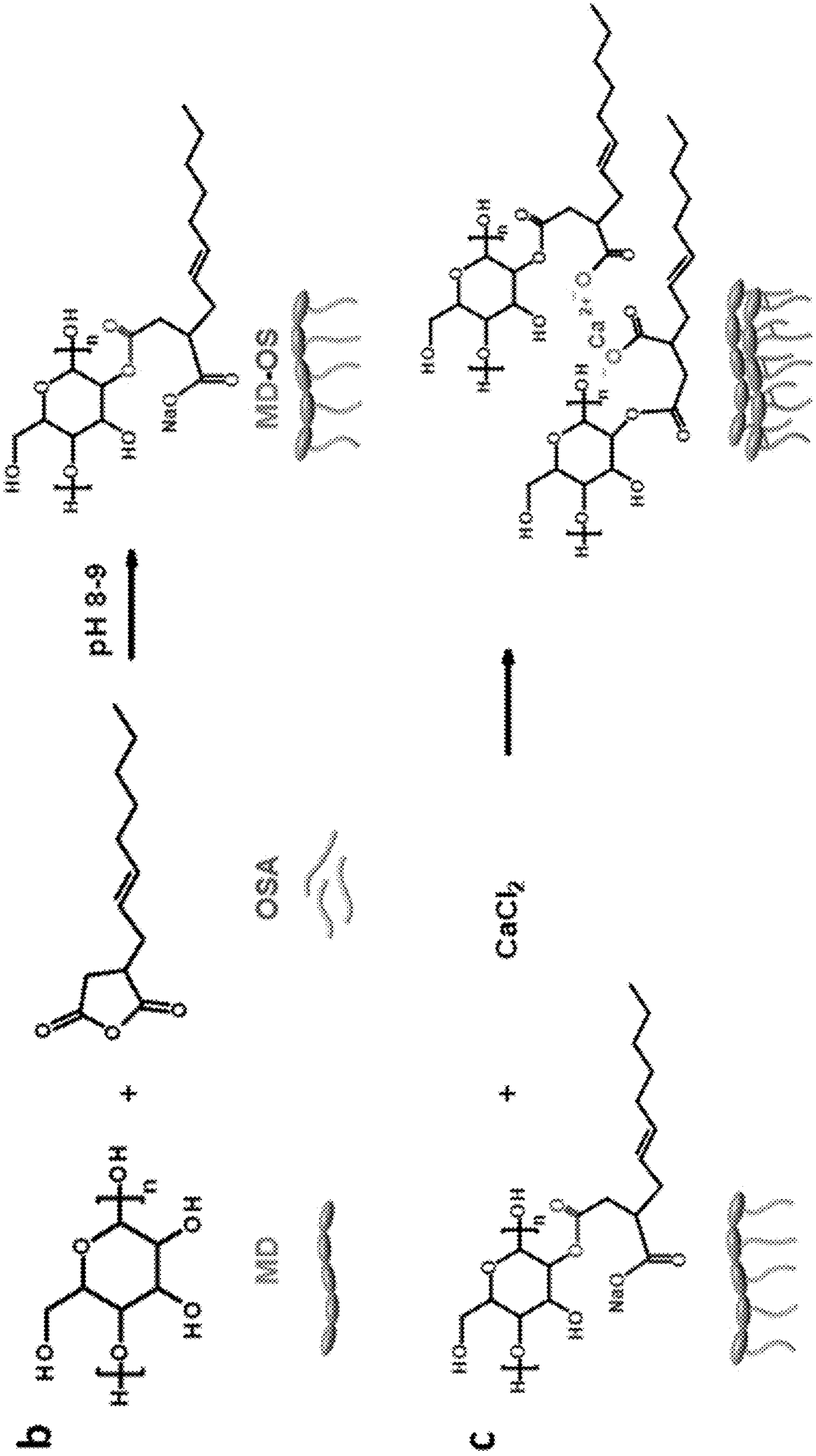
FIG. 1 shows (a) a schematic of the microencapsulation process based on the crosslinking of the amphiphilic polymer (MD-OS) in the microemulsion system. (b) Chemical reaction between maltodextrin and OSA. (c) Crosslinking reaction between MD-OS and $CaCl_2$.

Although claimed subject matter will be described in terms of certain examples, other examples, including examples that do not provide all of the benefits and features set forth herein, are also within the scope of this disclosure. Various structural, logical, and process step changes may be made without departing from the scope of the disclosure.

Ranges of values are disclosed herein. The ranges set out a lower limit value and an upper limit value. Unless otherwise stated, the ranges include the lower limit value, the upper limit value, and all values between the lower limit value and the upper limit value, including, but not limited to, all values to the magnitude of the smallest value (either the lower limit value or the upper limit value) of a range.

As used herein, unless otherwise stated, the term “group” refers to a chemical entity that is monovalent (i.e., has one terminus that can be covalently bonded to other chemical species), divalent, or polyvalent (i.e., has two or more termini that can be covalently bonded to other chemical species). The term “group” also includes radicals (e.g., monovalent and multivalent, such as, for example, divalent radicals, trivalent radicals, and the like). Illustrative examples of groups include:

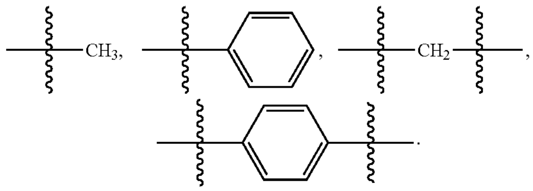

and

As used herein, unless otherwise indicated, the term “aliphatic” refers to branched or unbranched hydrocarbon groups that, optionally, contain one or more degree(s) of unsaturation. Degrees of unsaturation can arise from, but are not limited to, cyclic aliphatic groups. For example, the aliphatic groups/moieties are a $C_1$ to $C_{16}$ aliphatic group, including all integer numbers of carbons and ranges of numbers of carbons therebetween (e.g., $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, Cis, or $C_{16}$). Aliphatic groups include, but are not limited to, alkyl groups, alkene groups, and alkyne groups. The aliphatic group can be unsubstituted or substituted with one or more substituent(s). Examples of substituents include, but are not limited to, various substituents such as, for example, halogens (—F, —Cl, —Br, and —I), azide group, aliphatic groups (e.g., alkyl groups, alkene groups, alkyne groups, and the like), aryl groups, hydroxyl groups, alkoxide groups, carboxylate groups, carboxylic acid groups, ether groups, ester groups, amide groups, thioether groups, thioester groups, and the like, and combinations thereof.

The present disclosure provides microcapsules. The microcapsules are oil-in-water microcapsules where an oil or oil-based material is encapsulated by a shell. The shell comprises an amphiphilic polymers units. Also provided are amphipathic polymer units and methods of preparing microcapsules of the present disclosure and compositions comprising microcapsules of the present disclosure.

Presented is the combination of a hydrophilic polysaccharide and a hydrophobic fatty acid. This combination utilizes an amphiphilic polymer (e.g., the hydrophilic polysaccharide) for microencapsulation. For example, the present disclosure provides a hydrophilic polysaccharide functionalized with one or more octenylsuccinate groups that have a carboxylate anion after the ring is opened, which provides a structure to enable a crosslinking mechanism similar to that of alginate.

In an example, described is a water-soluble polymer, maltodextrin (MD), as a representative polysaccharide that can be widely obtained and derived from natural plants. A comb-shaped polymer, maltodextrin octenylsuccinate (MD-OS), was synthesized from the reaction between MD and octenyl succinic anhydride (OSA) (FIG. 1*b*).

In an aspect, the present disclosure provides amphiphilic polymer units. The amphiphilic polymer units comprise a polysaccharide (e.g., maltodextrin) and one or more aliphatic groups having one or more carboxylate groups.

In various examples, the polysaccharide of the amphiphilic polymer unit is a functionalized maltodextrin. The maltodextrin comprises 2 to 20 (e.g., 2, 3, 4, 5, 6, 7, 8, 9, 10, 11, 12, 13, 14, 15, 16, 17, 18, 19, or 20) glucosyl groups.

The amphiphilic polymer units of the present disclosure have the following structure:

(STRUCTURE I)

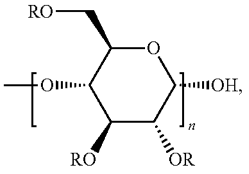

where each R is independently H or (STRUCTURE IA)

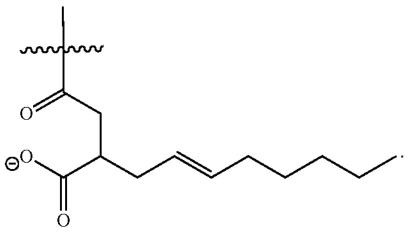

At least one R of a glucosyl group of the polysaccharide is STRUCTURE IA, where n 2 to 20, including all integer values and ranges therebetween. Although STRUCTURE I is depicted as having an alpha linkage, the polysaccharide may have beta linkages. Thus, in an example, the polysaccharide may have all alpha linkages, all beta linkages, or a combination thereof. In various examples, the polysaccharide has the following structure:

(STRUCTURE II)

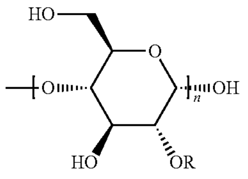

or (STRUCTURE III)

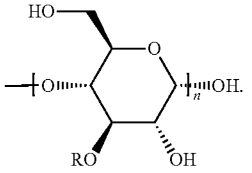

The polysaccharide has one or more STRUCTURE IA groups. In various examples, the glucosyl units have an average of 0.2-1.5 STRUCTURE IA groups, including all 0.01 values and ranges therebetween (e.g., 0.27-1.28). The number of groups can be varied by adjusting the starting materials used to synthesis (e.g., the ratio of maltodextrin to octenyl succinic anhydride (OSA) or glucosyl units of maltodextrin to OSA). Methods of preparing an amphiphilic polymer unit of the present disclosure are disclosed in the Example.

In an aspect, the present disclosure provides microcapsules. The microcapsules comprise a shell and a core.

The microcapsules of the present disclosure comprise a shell and a core. The shell is a polymer shell that is ionically-crosslinked. The shell comprises a plurality of amphiphilic polymer units of the present disclosure. The core comprises an oil or oil-based material. In various examples, the ionically-crosslinked shell encapsulates the oil or oil-based material, thus forming the microcapsule. For example, the amphiphilic polymer unit has the following structure:

(STRUCTURE I)

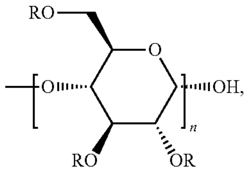

where each R is independently H or (STRUCTURE IA)

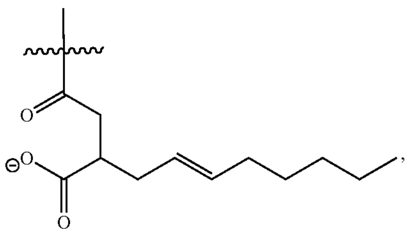

at least one R of a glucosyl group of the amphiphilic polymer unit is STRUCTURE IA, and n is 2 to 20. In various examples, the amphiphilic polymer unit has the following structure:

(STRUCTURE II)

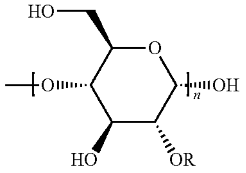

or (STRUCTURE III)

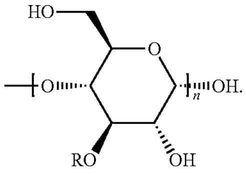

In various examples, the glucosyl units have an average of 0.2-1.5 STRUCTURE IA groups, including all 0.01 values and ranges therebetween (e.g., 0.27-1.28). The number of groups can be varied by adjusting the starting materials used to synthesis (e.g., the ratio of maltodextrin to OSA or glucosyl units of maltodextrin to OSA).

In various examples, the polymer shell may further comprise side products formed from the hydrolysis of OSA. For example, the polymer shell may comprise sodium octenylsuccinate or a different octenylsuccinate salt (e.g., calcium octenylsuccinate).

The polymer shell may be crosslinked with various divalent cations. The divalent cations form interstrand crosslinks between carboxylate groups of amphiphilic polymer units. Non-limiting examples of divalent cations include, $Ca^{2+}$, $Zn^{2+}$, $Mg^{2+}$, and combinations thereof. The divalent cations may be present in various ratios of STRUCTURE IA to divalent cation. For example, the ratio may be 1:1 to 1:4 (STRUCTURE 1A: divalent cation), including every ratio value and range therebetween. In various examples, the ratio is 1:2. In various embodiments, a microcapsule of the present disclosure comprises 5% or less divalent cation, based on the elemental composition excluding hydrogen.

The microcapsule may encapsulate various oils or oil-based materials. Non-limiting examples of oils include volatile oil, a food oil, carrier oil, an essential oil, a mineral oil, fragrance oil, and the like. In various examples, certain oils may be classified as one or more of the aforementioned classes of oil. As an illustrative example, an oil may be both a volatile oil and a food oil. This illustrative example is not intended to be limiting. Examples of oils include, but are not limited to, coconut oil, jojoba oil, apricot kernel oil, sweet almond oil, olive oil, argan oil, rosehip oil, black seed oil, grape seed oil, avocado oil, sunflower oil, and the like, and combinations thereof. In various examples, the oil may comprise one or more other compounds, such as, for example, a fragrance compound. The weight ratio of polymer shell to oil may be 1:1 to 1:5, including all values and ranges therebetween. The microcapsule has desirable loading capacity for various oils. The loading capacity is the weight percentage of cargo material relative to the total weight of the microcapsule. For example, the loading capacity is around 75%.

In an aspect, the present disclosure provides compositions. The compositions comprise the microcapsules of the present disclosure. In various examples, the composition comprises a carrier. The carrier may be an aqueous carrier.

The composition may comprise various microcapsules. Each microcapsule may encapsulate different oils or oil-based materials or the same oils or oil-based materials. The compositions may be used in various articles as described herein.

In an aspect, the present disclosure provides articles. The articles may comprise a microcapsule of the present disclosure or a composition of the present disclosure. The articles may be laundry softeners, cosmetic products, agrochemical products, and the like. For example, the articles may comprise microcapsules comprising fragrance oils in laundry softeners or cosmetics. In other examples, agrochemical articles may comprises microcapsules encapsulating agricultural chemicals. Other articles may be food products or pharmaceutical products.

In an aspect, the present disclosure provides methods encapsulating an oil or oil-based material with a plurality of ionically-crosslinked amphiphilic polymer units.

For example, a method for encapsulating an oil or oil-based material comprises: preparing a reaction mixture comprising the oil or oil-based material, a plurality of amphiphilic polymer units, and water, wherein the amphiphilic polymer units are STRUCTURE I, wherein each R of STRUCTURE I is independently H or STRUCTURE IA and at least one R of a glucosyl group of STRUCTURE I is STRUCTURE IA, and n of STRUCTURE I is 2 to 20, homogenizing the reaction mixture; and adding a salt comprising a divalent cation to the reaction mixture, where the oil or oil-based material is encapsulated in a microcapsule formed from the amphiphilic polymers and the salt.

In various examples, the amphiphilic polymer unit has the following structure:

(STRUCTURE I)

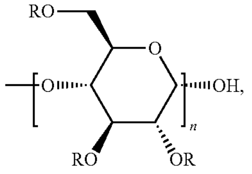

wherein each R is independently H or (STRUCTURE IA)

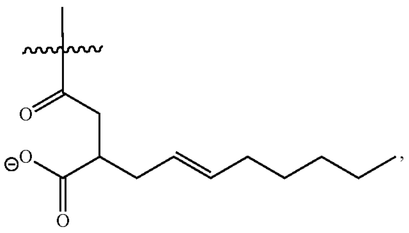

at least one R of a glucosyl group of the amphiphilic polymer unit is STRUCTURE IA, and n is 2 to 20. In various examples, the amphiphilic polymer unit has the following structure:

(STRUCTURE II)

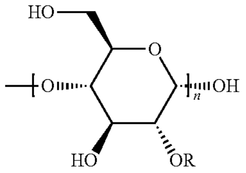

or (STRUCTURE III)

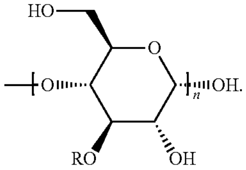

In various examples, the glucosyl units have an average of 0.2-1.5 STRUCTURE IA groups, including all 0.01 values and ranges therebetween (e.g., 0.27-1.28). The number of groups can be varied by adjusting the starting materials used to synthesis (e.g., the ratio of maltodextrin to OSA or glucosyl units of maltodextrin to OSA).

The polymer shell may be crosslinked with various divalent cations. The divalent cations form interstrand crosslinks between carboxylate groups of amphiphilic polymer units. Non-limiting examples of divalent cations include, $Ca^{2+}$, $Zn^{2+}$, $Mg^{2+}$, and combinations thereof. The divalent cations may be present in various ratios of STRUCTURE IA to divalent cation. For example, the ratio may be 1:1 to 1:4 (STRUCTURE 1A: divalent cation), including every ratio value and range therebetween. In various examples, the ratio is 1:2.

Various oils or oil-based materials may be encapsulated. The oil and the oil-based material are liquids. Non-limiting examples of oils include synthetic oils, volatile oils, food oils or food-based oils, carrier oils, essential oils, mineral oils, fragrance oils, and the like. Some oils may be classified as one or more of the aforementioned classes of oil. For example, corn oil, lemon oil, lavender oil, peppermint oil, or the like may be encapsulated.

The steps of the method described in the various embodiments and examples disclosed herein are sufficient to carry out the methods of the present invention. Thus, in an embodiment, the method consists essentially of a combination of the steps of the methods disclosed herein. In another embodiment, the method consists of such steps.

The following Statements provide various examples of the present disclosure:

Statement 1. A microcapsule comprising a shell and core, wherein the shell comprises a plurality of amphiphilic polymer units and the core comprises an oil or oil-based material, wherein at least some of the amphiphilic polymer units are ionically-crosslinked to other amphiphilic polymer units and the amphiphilic polymer unit has the following structure:

(STRUCTURE I)

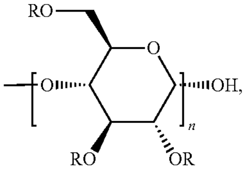

wherein each R is independently H or (STRUCTURE IA)

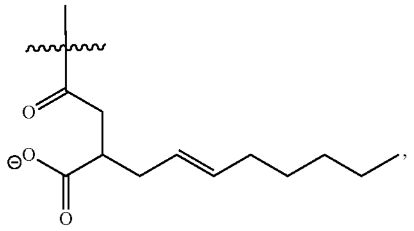

at least one R of a glucosyl group of the amphiphilic polymer unit is STRUCTURE IA, and n is 2 to 20.

Statement 2. A microcapsule according to Statement 1, wherein the amphiphilic polymer unit has the following structure:

(STRUCTURE II)

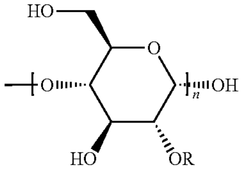

or (STRUCTURE III)

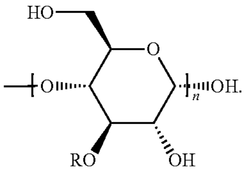

Statement 3. A microcapsule according to Statement 1 or Statement 2, wherein the amphiphilic polymer units are ionically-crosslinked with divalent cations.

Statement 4. A microcapsule according to Statement 3, wherein the divalent cations are chosen from $Ca^{2+}$, $Zn^{2+}$, $Mg^{2+}$, and combinations thereof.

Statement 5. A microcapsule according to Statement 3 or Statement 4, wherein the mole ratio of STRUCTURE IA to divalent cations is 1:1 to 1:4, including all ratio values and ranges therebetween (e.g., 1:2).

Statement 6. A microcapsule according to any one of the preceding Statements, wherein the microcapsule has a longest linear dimension of 200-1000 nm, including all values and ranges therebetween.

Statement 7. A microcapsule according to any one of the preceding Statements, wherein the oil is a volatile oil, synthetic oil, a food oil, carrier oil, an essential oil, a mineral oil, fragrance oil, or the like.

Statement 8. A microcapsule according to Statement 7, wherein the oil is a volatile oil.

Statement 9. A microcapsule according to any one of the preceding Statements, wherein the oil is a carrier oil.

Statement 10. A microcapsule according to Statement 9, wherein the carrier oil is chosen from coconut oil, jojoba oil, apricot kernel oil, sweet almond oil, olive oil, argan oil, rosehip oil, black seed oil, grape seed oil, avocado oil, sunflower oil, and the like, and combinations thereof.

Statement 11. A microcapsule according to any one of the preceding Statements, wherein the oil is a fragrance oil or comprises one or more fragrance compounds.

Statement 12. A microcapsule according to any one of the preceding Statements, wherein the ratio of polymer shell to oil or oil-based material is 1:1 to 1:5, including all ratio values and ranges therebetween.

Statement 13. A microcapsule according to any one of the preceding Statements, wherein the average number of STRUCTURE IA groups to each glucosyl unit of STRUCTURE I is 0.2-1.5, including all 0 values and ranges therebetween (e.g., 0.27-1.28).

Statement 14. A method for encapsulating an oil or oil-based material, comprising: preparing a reaction mixture comprising the oil or oil-based material, a plurality of amphiphilic polymer units, and water, wherein the amphiphilic polymer units are STRUCTURE I, wherein each R of STRUCTURE I is independently H or STRUCTURE IA and at least one R of a glucosyl group of STRUCTURE I is STRUCTURE IA, and n of STRUCTURE I is 2 to 20, homogenizing the reaction mixture; and adding a salt comprising a divalent cation to the reaction mixture, wherein the oil or oil-based material is encapsulated in a microcapsule formed from the amphiphilic polymers and the salt.

Statement 15. A method according to Statement 14, wherein the divalent cations chosen from $Ca^{2+}$, $Zn^{2+}$, $Mg^{2+}$, and combinations thereof.

Statement 16. A method according to Statement 14 or Statement 15, wherein the mole ratio of STRUCTURE IA to divalent cations is 1:1 to 1:4, including all ratio values and ranges therebetween (e.g., 1:2).

Statement 17. A method according to any one of Statements 14-16, wherein the oil is a volatile oil, a synthetic oil, a food oil, carrier oil, an essential oil, a mineral oil, fragrance oil, or the like.

Statement 18. A method according to any one of Statements 14-17, wherein the oil is a volatile oil.

Statement 19. A method according to any one of Statements 14-18, wherein the oil is a carrier oil.

Statement 20. A method according to Statement 19, wherein the carrier oil is chosen from coconut oil, jojoba oil, apricot kernel oil, sweet almond oil, olive oil, argan oil, rosehip oil, black seed oil, grape seed oil, avocado oil, sunflower oil, and the like, and combinations thereof.

Statement 21. A method according to any one of Statements 14-20, wherein the oil is a fragrance oil or comprises one or more fragrance compounds.

Statement 22. A method according to any one of Statements 14-21, wherein the ratio of polymer shell to oil is 1:1 to 1:5, including all ratio values and ranges therebetween.

Statement 23. A method according to any one of Statements 14-22, wherein the average number of STRUCTURE IA groups to each glucosyl unit of STRUCTURE I is 0.2-1.5, including all 0.01 values and ranges therebetween (e.g., 0.27-1.28).

Statement 24. An amphiphilic polymer having the structure of STRUCTURE I, wherein each R of STRUCTURE I is independently H or STRUCTURE IA and at least one R of a glucosyl group of STRUCTURE I is STRUCTURE IA, and n of STRUCTURE I is 2 to 20.

Statement 25. An amphiphilic polymer according to Statement 24, wherein the amphiphilic polymer has the structure of STRUCTURE II or STRUCTURE III.

Statement 26. An amphiphilic polymer according to Statement 24 or Statement 25, wherein the average number of STRUCTURE IA groups to each glucosyl unit of STRUCTURE I is 0.2-1.5, including all 0.01 values and ranges therebetween (e.g., 0.27-1.28).

Statement 27. A composition comprising a plurality of microcapsules of claim 1 and a carrier.

Statement 28. A composition according to Statement 27, wherein the carrier is an aqueous carrier.

Statement 29. An article comprising the microcapsules according to any one of Statements 1-13 or the composition according to Statement 27 or Statement 28.

The following example is presented to illustrate the present disclosure. It is not intended to be limiting in any matter.

Example

This example provides a description of methods of making and using microemulsions of the present disclosure.

Combining both the advantages of the alginate microencapsulation method and the micelle method, it suggests a question on whether we can create a polymer structure that contains anion groups similar to those in alginate that allow it to be crosslinked by divalent cations, meanwhile the polymer has amphiphilic property that allows it to concentrate at the surface of the core to enable the facile and effective O/W microemulsion approach on a large scale (FIG. 1*a*).

Alginate, a natural polysaccharide, has been used for microencapsulation because its unique polyanion structure in water that can enable a sol-gel transition to solidify the polymer from the solution. The process uses divalent cations such as calcium ions to react and create ionic bonds with the anions of the polymer chains to form the crosslinked shell. However, alginate is not able to spontaneously aggregate near the surface of the core material. To concentrate the polymer near the surface of the core and obtain the desired size of microcapsules, it usually requires a small nozzle extrusion setup or a droplet dispersion of polymer solution in W/O emulsion which consumes a large amount of oil as the continuous phase. On the other side, amphiphilic polymers containing both hydrophilic and hydrophobic parts in the structure can form micelles that are often used for delivering water-insoluble drugs, where the structure can spontaneously encapsulate the core in water and disassemble to release drugs under environmental changes (e.g. pH variations). However, micelles are not stable microcapsules as they are easy to collapse when the water is removed. To use the amphiphilic polymers to create stable microcapsules that can be separated from the media, a hardening/crosslinking process is necessary. Combining both the advantages of the alginate microencapsulation method and the micelle method, it suggests a question on whether we can create a polymer structure that contains anion groups similar to those in alginate that allow it to be crosslinked by divalent cations, meanwhile the polymer has amphiphilic property that allows it to concentrate at the surface of the core to enable the facile and effective O/W microemulsion approach on a large scale (FIG. 1*a*).

In an example, described is a water-soluble polymer, maltodextrin (MD), as a representative polysaccharide that can be widely obtained and derived from natural plants. A comb-shaped polymer, maltodextrin ocentylsuccinate (MD-OS), was synthesized from the reaction between MD and octenyl succinic anhydride (OSA) (FIG. 1*b*). The detailed reaction mechanism was studied by analyzing the chemical structure of a series of synthesized and purified polymers.

Also described is the ratio between MD and OSA in the synthesis to achieve a desirable overall efficiency. In a microencapsulation experiment, the mechanism of the crosslinking between the hydrophilic polysaccharide (e.g., MD-OS polymer) and cations (e.g., calcium ions) was studied using elemental analysis and binding energy analysis. Also described is a desirable ratio between the polymer and the calcium ions (FIG. 1*c*) to achieve desirable crosslinking performance in the microencapsulation process. Finally, to demonstrate that the application of this microencapsulation method is universal, the present method was used to encapsulate several oils as the cargo materials such as corn oil, lemon oil, lavender oil, and peppermint oil and obtained high loading capacity.

Materials. MD was purchased from Sigma-Aldrich, which had a broad molecular weight distribution and dextrose equivalent of 4-6 and 17-19, respectively. OSA was provided by Dixie Chemical Company containing 80% cis and 20% trans isomers. Sodium hydroxide was purchased from Sigma-Aldrich and dissolved in distilled water to form a 1 mol $L^{-1}$ solution before use. Calcium chloride dihydrate was purchased from Sigma-Aldrich and dissolved in distilled water before use. Spectrum Labs Biotech CE dialysis tubing used for the dialysis process has a molecular weight cutoff of 0.1-0.5 kD. Cargo materials for the microcapsules included corn oil (Marzola), lemon oil (Aura Cacia), lavender oil (Pranarom), and peppermint oil (Aura Cacia), which were purchased from a local grocery store. Glass fiber filter paper (Grade 934-AH) for filtration was purchased from Fisher Scientific, Inc.

Synthesis of MD-OS. Different mole ratios between the glucose unit of MD and OSA was used, including 1:2, 1:1, 2:1, and 3:1, respectively. The MD powder (e.g. 1 g) was dissolved in 20-30 ml distilled water at room temperature and the pH of the solution was adjusted to 8-9. OSA (e.g., 1.178 ml, 1:1 ratio) was added in small portions, stepwise, to the MD solution with a gradually increasing volume as the reaction proceeded from the low rate to high rate stage. OSA is insoluble in water and formed fine oil droplets in the aqueous solution. As the pH of the system decreased during the reaction, 1 mol $L^{-1}$ NaOH solution was added dropwise to the OSA/MD/water system to control the pH of the mixture between 8 and 9 allowing the reaction to occur. The process of adding OSA and using NaOH solution to adjust the pH was repeated until the solution turned clear, indicating the complete consumption of OSA, which takes up to 20 hours. After the reaction was complete, the polymer solution was lyophilized to obtain the final product in the form of a white powder. In addition to the main reaction, OSA may also be hydrolyzed in a side reaction to form a small molecule, sodium octenylsuccinate. To remove sodium octenylsuccinate, the polymer was purified using dialysis. Distilled water, as the buffer, was replaced every hour for two days to remove the small molecules. In addition, to study the side reaction between OSA and water, OSA was dissolved in water without adding MD to compare with the product from the main reaction.

Microencapsulation and crosslinking. After MD-OS was synthesized, it was used as the shell material to encapsulate oils to produce solid microcapsules. Different weight ratios between MD-OS and oil were studied, including 1:3, 1:4, and 1:5. First, a certain amount of MD-OS polymer (e.g., 0.1 g) was dissolved in water (20-30 ml). Then, the oil (e.g., 0.3 g) was added into the polymer solution and dispersed into microdroplets using an IKA T25 digital Ultra Turrax homogenizer with a S25N-8G probe at a stirring speed of 10K rpm for 5 minutes. After the emulsion was formed, foam was removed from the upper layer and then a 0.05 g $ml^{-1}$ $CaCl_2$/water solution was added into the suspension at a mole ratio of 1:2 for OSA and $CaCl_2$). $CaCl_2$) acted as the crosslinking agent for the polymer to form a stable shell. To further understand this crosslinking mechanism, different mole ratios of 1:1, 1:2, and 1:4 for OSA and $CaCl_2$), respectively, were also tried. After the microcapsules were crosslinked and solidified, some floccules (aggregates of microcapsules) were observed either floating on the top of the solution or depositing at the bottom, depending on the density of the microcapsules. The particles were separated from solution by filtration with glass fiber filter paper. To demonstrate that this system can be generally used for encapsulating oil-based core materials, this encapsulation method was applied on several different types of oils including corn oil, lemon oil, lavender oil, and peppermint oil.

Fourier-transform infrared (FTIR) spectroscopy. MD-OS polymer (MD:OSA reactant ratios of 1:1, 1:2, 2:1, and 3:1) before and after dialysis, MD, and sodium octenylsuccinate were tested by FTIR. The samples were characterized in the powder form using a Shimadzu IRAffinity-1 S Fourier transform infrared spectrometer with an attenuated total reflectance setup.

Nuclear magnetic resonance (NMR) spectroscopy. The chemical structures of reactants and product samples, including MD, sodium octenylsuccinate salt, the MD-OS branched polymer synthesized from reactants at different ratios, and the purified polymers after dialysis, were characterized with an INOVA 500 MHz NMR spectrometer. The samples were dissolved in deuterated water for testing. The loading capacity of the microcapsules was also measured with NMR by comparing the spectra of the oil in the microcapsules with the pure oil of known weight. The oil was extracted from the microcapsules by dissolving the microcapsule solid aggregates in deuterated acetone.

Scanning electron microscopy (SEM). To prepare SEM samples, particle aggregates were first dispersed in water by sonication. Then, one droplet of the suspension was placed on a piece of silicon wafer pre-cleaned with acetone and air dried. The solid sample on the silicon wafer was immersed in distilled water for 4 hours to remove NaCl, $CaCl_2$), and any free polymer that was not bound to the surface of the microcapsules or incorporated in the shell. The experiment was performed using a TESCAN Mira3 FESEM with an accelerating voltage of 5 kV at a working distance of 5 mm. The energy-dispersive X-ray spectrometer within the SEM system was used for elemental analysis.

Transmission electron microscopy (TEM). Microcapsule samples were dispersed in water and a droplet of the particle suspension was placed on a formvar-coated copper grid and air dried. The grids were subsequently suspended in water for 4-5 h to remove salts and free polymers and then air dried. Next, the sample was negatively stained through the addition of a drop of uranyl acetate (1.5% in $ddH_2O$) for a few seconds to create a better contrast for electron microscopy. After staining, the staining solution was carefully removed with filter paper. The imaging was performed in a FEI F20 TEM/STEM with an acceleration voltage of 200 kV.

X-ray photoelectron spectrometry (XPS). The microcapsules, the as-synthesized polymer crosslinked by calcium ions, calcium octenylsuccinate from the reaction between sodium octenylsuccinate and $CaCl_2$), and $CaCl_2$) samples were analyzed using a Scienta Omicron ESCA-2SR XPS system at an operating pressure of ~$5\times10^{-9}$ Torr. Monochromatic Al Kα X rays (1486.6 eV) was used with photoelectrons collected from a 5 mm diameter analysis area. Photoelectrons were collected at a 0° emission angle with a source to an analyzer angle of 54.7°. A hemispherical analyzer determined the electron kinetic energy using a pass energy of 200 V for wide/survey scans, and 50 V for high resolution scans. A flood gun was used for charge neutralization of non-conductive samples. The high-resolution scans of C is, O is, and Ca 2p were taken at 5 scans each, with corresponding dwell times of 0.2 ms, 0.2 ms, and 1 ms, respectively.

Synthesis of the MD-OS polymer. The amphiphilic polymer MD-OS was synthesized by the reaction between MD and OSA carried out in a heterogeneous system comprising water and oil phases. The reaction was under alkaline conditions, in which a hydroxyl group in MD converts into an alkoxide ion, a strong nucleophile. Then, at the OSA/water interface, the alkoxide ion of MD attacks one carbonyl group of the cyclic anhydride of OSA, opening the ring and creating an ester bond which allows an octenylsuccinate (OS) branch to be attached to the MD main chain. This OS branch has another carboxylate group that pairs with a sodium ion in solution to form a salt. The chemical reaction is shown in FIG. 1*b*.

Figure 2:
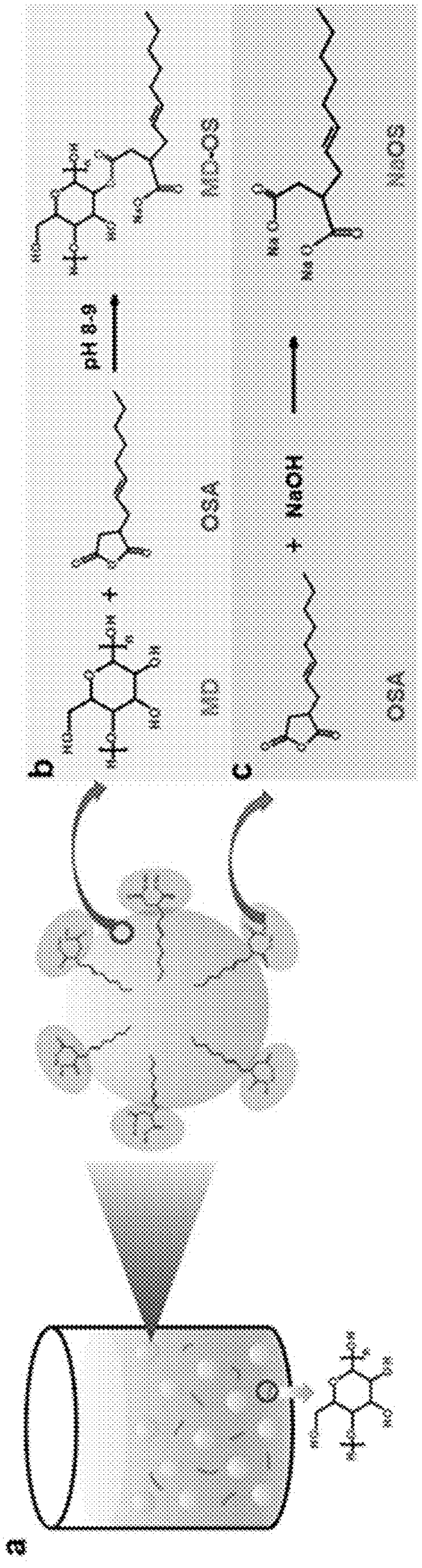
FIG. 2 shows (a) a schematic of the mixture system of the reactants (b) Main reaction between maltodextrin and OSA (c) Side reaction between OSA and sodium hydroxide (d) FTIR spectra of maltodextrin (MD), sodium octenylsuccinate (NaOS), and the as-synthesized and purified MD-OS polymer product, from top to bottom. (e) FTIR spectra of sodium octenylsuccinate (NaOS), ethyl octenylsuccinate (Et-OS), and the purified MD-OS polymer, from top to bottom. (f) FTIR spectra of the purified MD-OS polymers made with reactant ratios of 3:1, 2:1, 1:1 and 1:2 between the glucose unit of maltodextrin and OSA, from top to bottom.
Figure 2:
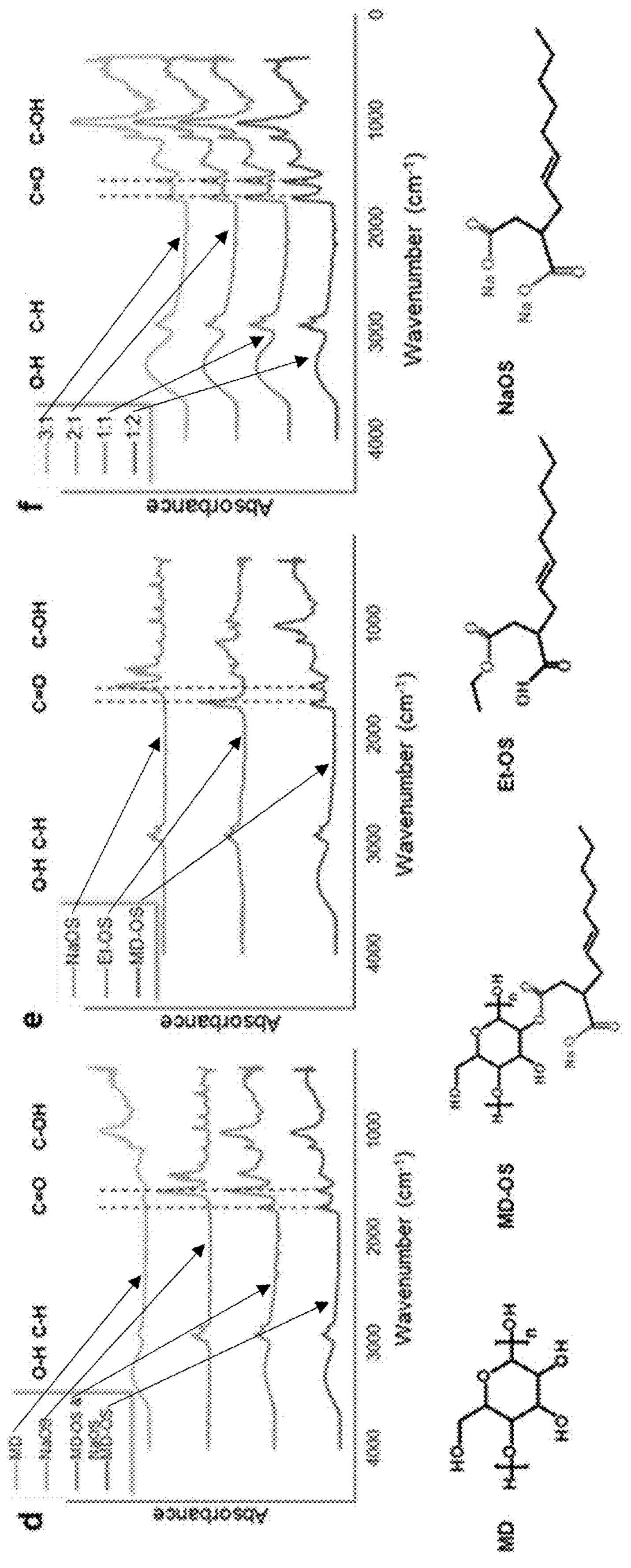

Due to the hydrophobic property, when subjected to fast stirring, OSA is dispersed in the water as fine oil droplets. The reaction between MD and OSA can only occur at the oil/water interface (FIG. 2*a*). Therefore, the reaction rate is controlled by the concentration of MD chains at the oil/water interface that are in contact with OSA molecules. At the beginning, the reaction rate between MD and OSA is very low since the hydrophilicity of the MD chain has limited capability to interact with the OSA molecules. As the reaction continues, it was observed that the reaction became faster when part of the MD chain has been grafted with OSA, which may be due to the fact that the aliphatic branches increase the hydrophobicity of the polymer and make it more prone to stay at the surface of the OSA droplets. This further increases the opportunity of interaction between the OSA molecule and hydroxyl groups of MD. It was found that as the reaction proceeds to the high rate state, the surfactant-like MD-OS polymer turns the mixture into an emulsion, which accelerates the speed of the decrease of pH and the consumption of NaOH. When the OSA is almost consumed, the solution turns clear. After synthesis is completed and the pH of the solution is stabilized at 8-9, the product obtained is the branched copolymer MD-OS.

In the process of the synthesis of MD-OS, in addition to the main reaction, there is also a possible side reaction between water and OSA under alkaline conditions in which the OSA molecule is hydrolyzed to a diacid and further neutralized to a sodium octenylsuccinate salt. The main reaction and side reaction are shown in FIGS. 2*b* and 2*c*. In order to analyze the detailed molecular structure of the OSA-modified maltodextrin (MD-OS) in the main reaction, the polymer was purified using dialysis. To confirm the side reaction between OSA and water, the product was obtained from the reaction in which OSA was completely dissolved in sodium hydroxide water solution and compared it with the as-synthesized polymer and the purified polymer by chemical analysis.

FIG. 2*d* shows the FTIR spectra of the MD, sodium octenylsuccinate, and the as-synthesized and purified MD-OS polymer. Based on the spectra of the first three materials, it could be seen that the as-synthesized MD-OS polymer had the structure of both MD and sodium octenylsuccinate salt, which confirmed the existence of the side reaction. According to the IR spectrum table and literature, the broad peak between 3700-3000 $cm^{-1}$ correlates to 0-H stretching and the peak at 1010 $cm^{-1}$ correlates to C—O stretching of the alcohol, which are both from MD, while the triple peak at 2950-2850 $cm^{-1}$ is assigned to the C—H stretching of the OS branch. There are also two important bands at 1720 $cm^{-1}$ and 1570 $cm^{-1}$ indicating C═O stretching in ester and carboxylate groups, which are directly related to the chemical bonds formed in the MD-OS polymer and sodium octenylsuccinate during the reaction. To assign the two peaks, the comparison of spectra of different molecules is provided in FIG. 2*d*. Sodium octenylsuccinate only had a carboxylate group while the MD-OS polymer had both ester and carboxylate groups. It was noted that the spectrum of sodium octenylsuccinate has a peak at 1570 $cm^{-1}$ but does not have a similar peak at 1720 $cm^{-1}$, suggesting that the former band correlates to the carbonyl group in sodium carboxylate while the latter correlates to the carbonyl group in the ester bond. As shown in the fourth spectrum in FIG. 2*d*, after using dialysis to remove low molecular weight sodium octenylsuccinate in the purified MD-OS, the peak at 1570 $cm^{-1}$ was significantly reduced, which further proves that it correlates to the carboxylate group. In the spectrum of the purified polymer, the peak at 1570 $cm^{-1}$ still remained, suggesting that, when the anhydride reacts with one hydroxyl group of MD to form an ester bond, the other acyl group in the anhydride turns into a carboxylate salt. The spectrum of the purified MD-OS polymer was compared with ethyl octenylsuccinate synthesized from ethanol and OSA. As shown in FIG. 2*e*, ethyl octenylsuccinate has a strong ester band at 1705-1720 $cm^{-1}$, which confirms that the peak at 1720 $cm^{-1}$ is assigned to the carbonyl group of the ester bond between the MD chain and OS branch in the MD-OS polymer.

FIG. 2*f* shows the FTIR spectra of the dialyzed MD-OS polymer synthesized from MD and OSA with mole ratios between the glucose unit and OSA molecules of 3:1, 2:1, 1:1, and 1:2, from top to bottom. The MD peak areas correlating with O—H stretching and C—OH stretching decrease, while the OS peak areas correlating to C—H stretching and C═O stretching increase. This indicates the decreasing mole fraction of MD and increasing mole fraction of OS branches in these polymers.

Figure 3:
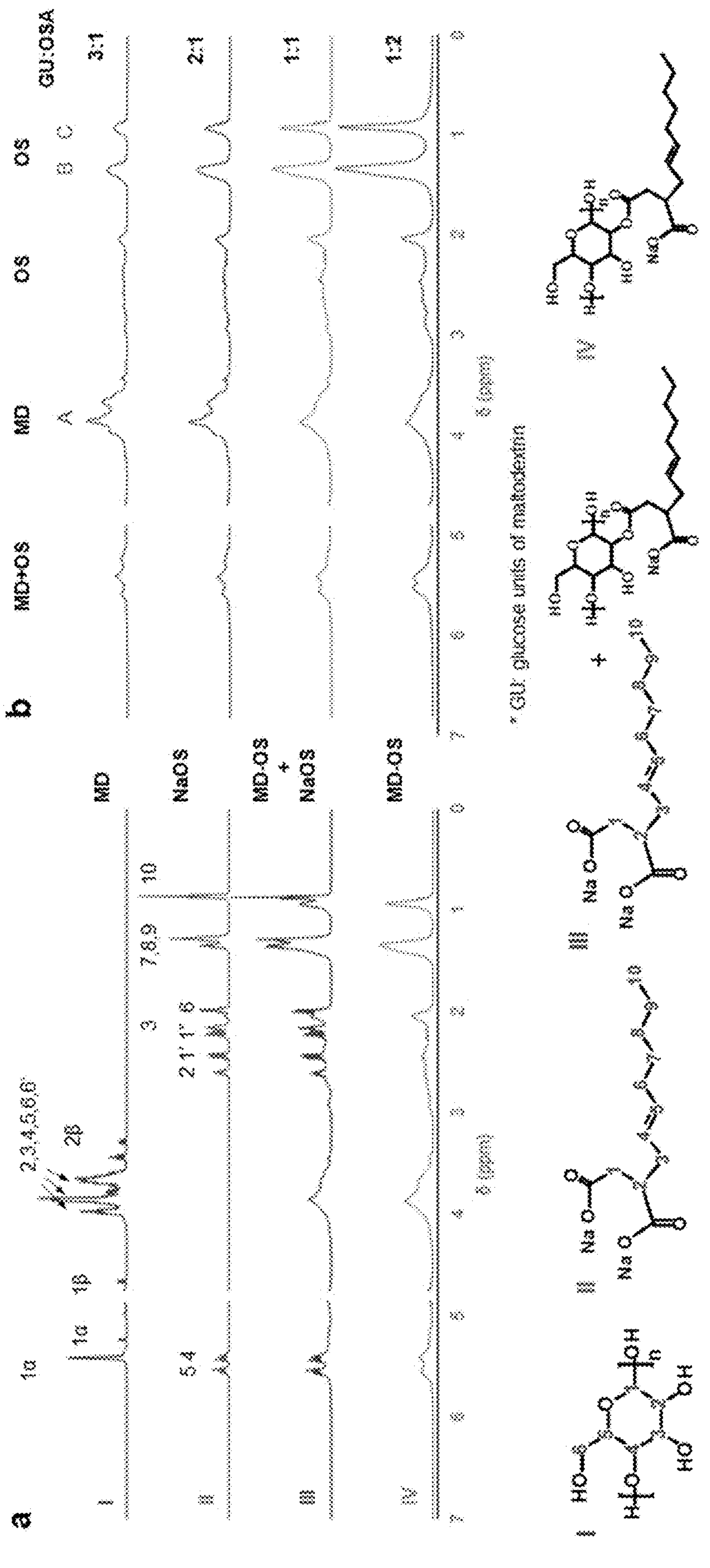
FIG. 3 shows (a) NMR spectra of (I) maltodextrin, (II) sodium octenylsuccinate, (III) as-synthesized MD-OS polymer and (IV) MD-OS polymer purified by dialysis. In the last two samples, the molar ratio between the glucose unit of maltodextrin and the OSA molecules was 1:1 before synthesis. (b) NMR spectra of the MD-OS polymers after dialysis with reactant ratios of 3:1, 2:1, 1:1, and 1:2 (glucose unit: OSA), from top to bottom (c) Ratio of the octenylsuccinate segment to maltodextrin segment in the polymer at different ratios of the reactants. (d) Percentage of OSA consumed in synthesis of the polymer and hydrolyzation at different ratios of the reactants.
Figure 3:
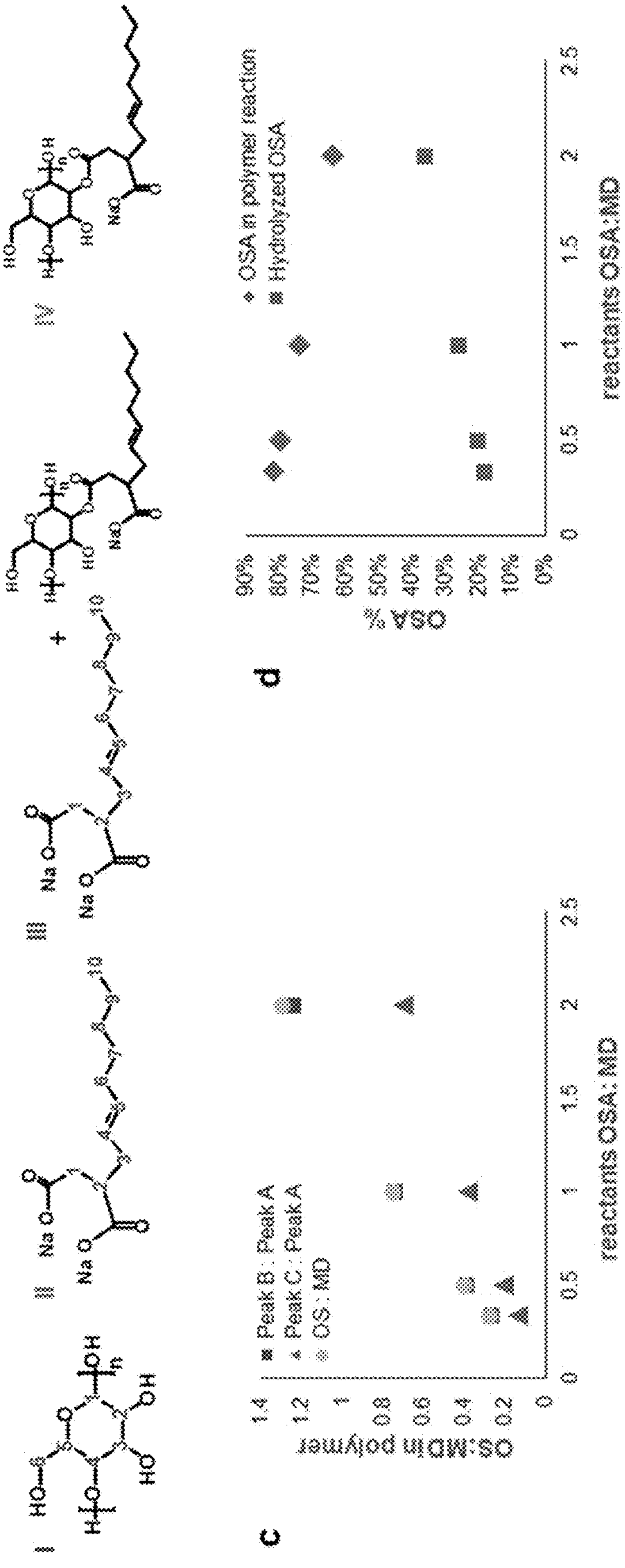

FIG. 3*a* shows the NMR spectra of MD, sodium octenylsuccinate, and the as-synthesized and purified MD-OS polymers. In the structural formula of the MD and sodium octenylsuccinate molecules, the carbon atoms are numbered to assign the positions of the protons that are attached to them. The spectrum of MD (FIG. 3*a*(I)) has groups of peaks between 3 and 4.5 ppm, which correspond to the protons of H2, H3, H4, H5, H6, and H6' of the glucose units. The peaks at 5.24 and 4.66 ppm are correlated to H1 of the alpha-glucose and beta-glucose at the end of the polymer chains, respectively. The broader peak at 5.42 is correlated to the polymeric form of H1 in the alpha-glucose, indicating that alpha linkages dominate the connected glucose units. FIG. 3*a*(II) shows the structure of sodium octenylsuccinate, which is the product of the side reaction between OSA and sodium hydroxide. Using the NMR $^1$H-$^1$H 2D spectrum, and based on the multiplicity and integration of the peaks, we analyzed those corresponding to the detailed structure of sodium octenylsuccinate and assigned the peaks to the protons in the molecule, as shown in FIG. 3*a*.

FIG. 3*a*(III) shows the as-synthesized MD-OS polymer from the reaction between MD and OSA at a mole ratio of 1:1 for the glucose unit of MD and the OSA molecules. FIG. 3*a*(IV) shows the structure of the purified polymer after dialysis in which the small molecular weight molecules have been removed. From the comparison between these spectra, we found that the as-synthesized polymer contained both MD segments and OS segments in the structure. Additionally, the spectrum of the small molecule sodium octenylsuccinate (FIG. 3*a*(II)) shows sharp peaks in the range of 0.5-3.7 and 5-6 ppm, while the spectrum of the purified polymer (IV) shows broad peaks in the same region. In comparison, the spectrum of the as-synthesized polymer product (III) shows a combination of the sharp peaks and the broad peaks which indicates that it contains a mixture of sodium octenylsuccinate and the pure branched polymers. This is consistent with the results from the FTIR analysis. Therefore, the broadened peaks at 0.5-3.7 and 5-6 ppm are the indication of the formation of the branched polymers.

FIG. 3*b* shows the NMR spectra of a series of purified MD-OS polymers that were synthesized from the reactants at different ratios. The broad peak at 3.3-4.3 ppm belongs to the MD segment and the peaks at 1 and 1.3 ppm belong to the OS segment from FIG. 3*a*, thus their integrations were used for calculations of the mole fractions of MD and the OS branch in the polymer, respectively. By integrating the peaks at 3.3-4.3, 1.35 and 1 ppm, and then comparing the ratio between the peak areas of MD and OS segments, it was found that reactant mole ratios (glucose unit: OSA) of 3:1, 2:1, 1:1, and 1:2 resulted in final products that featured averagely each MD glucose unit attached with 0.27, 0.40, 0.74, and 1.28 OS branches, respectively (FIG. 3*c*). Correspondingly, the percentage of OSA molecules participating in the reaction with MD was 82, 80, 74, and 64%, respectively, which means that approximately 18, 20, 26, and 36% of the OSA molecules were hydrolyzed and reacted with NaOH to form the small molecule sodium octenylsuccinate in the side reactions (FIG. 3*d*). Considering both the resulting number of OS branches on maltodextrin and the OSA utilization efficiency, we determined a reactant ratio of 1:1 to be the optimal ratio for this reaction in which 70-80% of the OSA reacts with MD, while 20-30% is converted into sodium octenylsuccinate salt. Therefore, the polymer synthesized with the 1:1 reactant ratio were used for the microencapsulation experiment.

In the synthesis of the MD-OS polymer, hydroxide ions in water are more likely to react with the hydroxyl groups attached to the secondary carbon atoms on the glucose unit of MD, converting them to alkoxide ions, rather than with the primary carbon hydroxyl group. This is due to the fact that the electronegativity of the hydroxide ion in water is lower than that of the alkoxide ion from primary alcohols, while it is higher than the electronegativity of the alkoxide ion from secondary alcohols. As a result, the alkoxide ion formed from the secondary alcohol reacts with the anhydride group of OSA and an octenylsuccinate chain is attached to the secondary carbon in the MD.

Microencapsulation. The MD-OS polymer is an amphiphilic polymer with a hydrophilic MD main chain and hydrophobic OS branches consisting of aliphatic chains. After emulsification of the mixed oil/MD-OS/water system, a stable microemulsion is formed in which the oil droplets dispersed in water are surrounded by the MD-OS polymer. When the polymer is at the oil/water interface, the hydrophobic OS branches stay in the oil phase while the hydrophilic MD chain stays in the water phase outside of the oil droplet. This polymer layer temporarily stabilizes the oil droplets in the water and can be dissociated when subjected to substantial external force. In order to solidify the shell and allow the microcapsules to be separated from water by filtration, the polymer layer needs to be crosslinked to form an integrated network. It was found that the comb-shaped, branched polymer can be crosslinked using calcium ions to create a stable network which becomes a denser solid when it is dried in the air. The reason for the crosslinking can be explained by the fact that a $Ca^{2+}$ ion is able to pair with two carboxylate ions from the OS branches and can act as a bridge connecting OS groups of different polymer chains.

Figure 4:
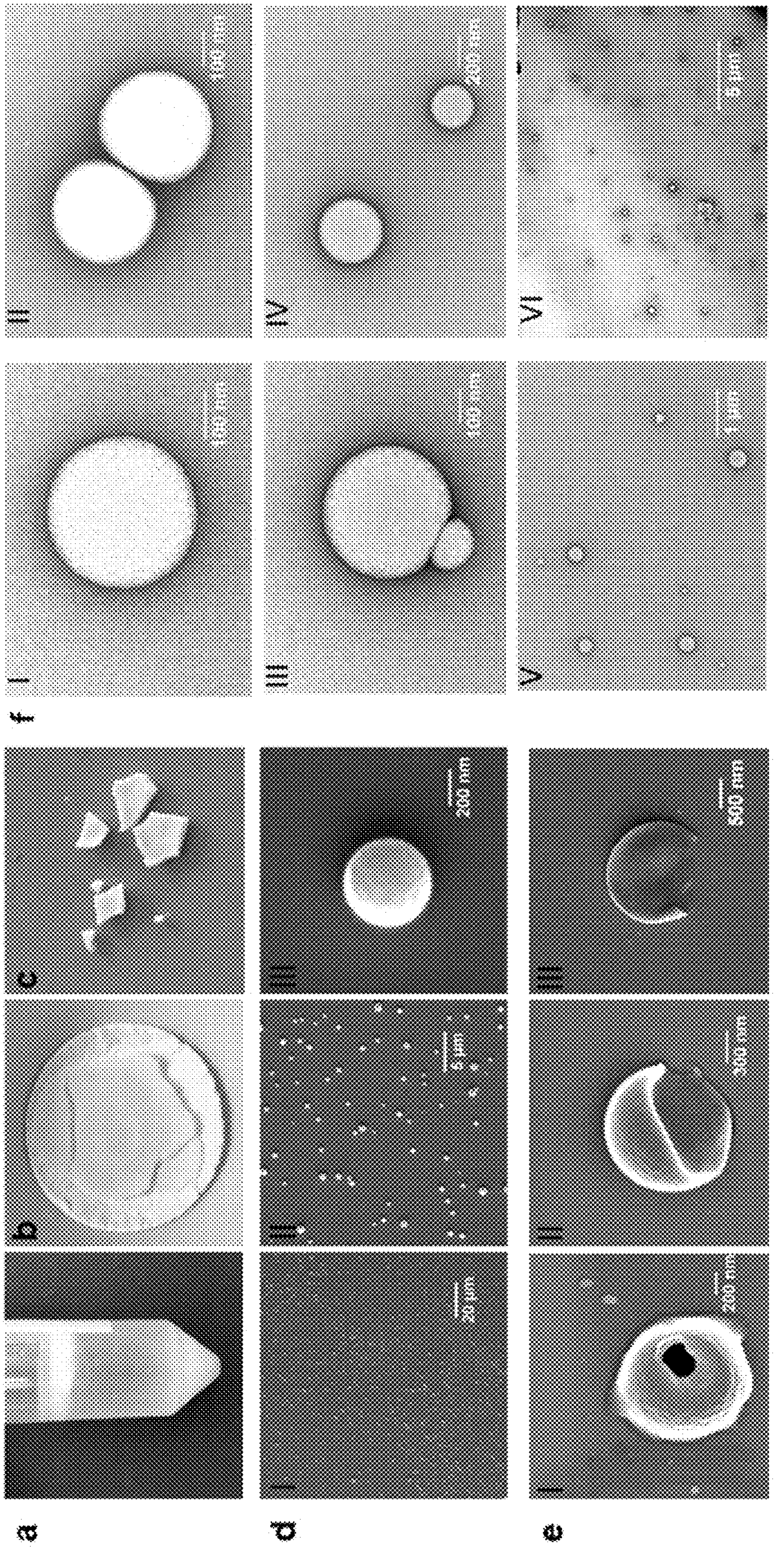
FIG. 4 shows (a) a suspension of microcapsule aggregates loaded with corn oil in water. (b, c) Microcapsule aggregates after filtration. (d) SEM image of the microcapsules at (I-III) different magnifications. (e) Broken microcapsules. (f) TEM images of the microcapsules with corn oil (stained with uranyl acetate).

This microencapsulation method has been applied to different types of oils, which show similar results. Here, corn oil was used as a representative cargo material in the characterizations. FIG. 4*a-c* shows the stabilized microcapsules after crosslinking. The aggregates can be filtered to form a solid, bulk sample. SEM images show that the majority of the microcapsules have a size range of 200-1000 nm under this experiment condition, while very few microcapsules have a size beyond this range (FIG. 4*d*). Some broken particles in micrometer size indicate that the microcapsules have a core-shell structure (FIG. 4*e*). Moreover, as shown in the TEM images in FIG. 4*f*, individual particles have a perfect spherical shape, while two particles adjacent to each other are slightly deformed, suggesting that the inner core material is in fluid form. After the microcapsules are produced, they can be kept as suspension in water on shelf for several months. As we observed, they are still integrated capsules after several months and can be obtained by filtration.

Figure 5:
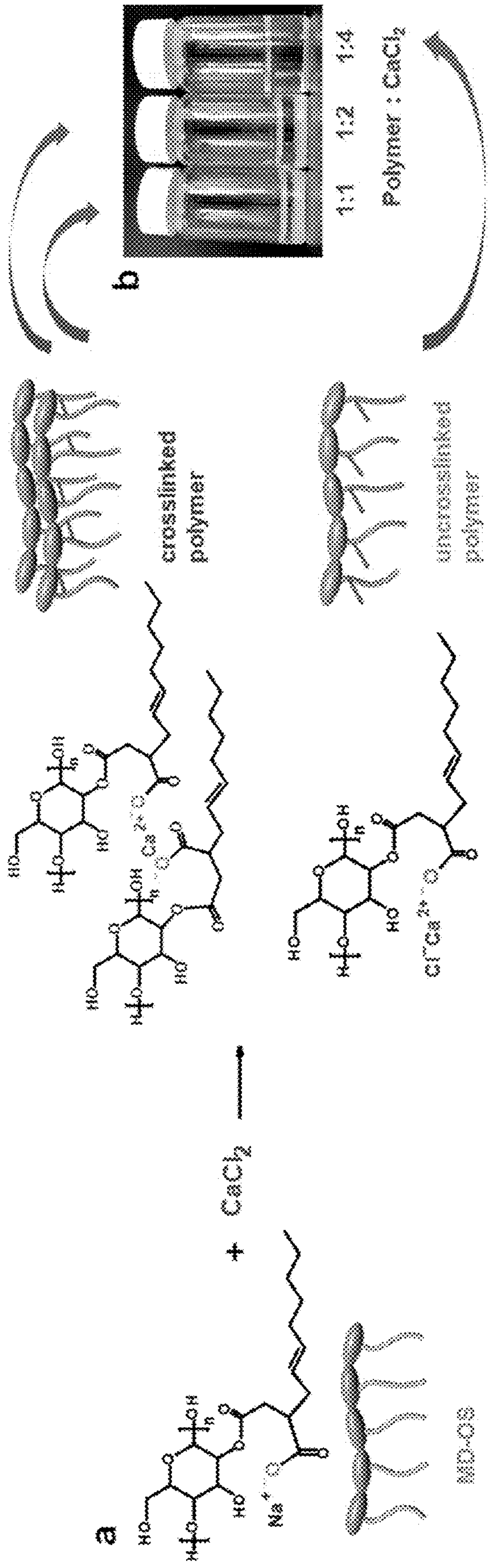
FIG. 5 shows (a) a reaction between the MD-OS branched polymer and $CaCl_2$). An appropriate amount of $CaCl_2$) causes crosslinking between the polymers, while an excess amount of $CaCl_2$) results in a water-soluble polymer. (b) Precipitates formed from the solution mixture of the as-synthesized MD-OS polymer and $CaCl_2$) with mole ratios between the octenylsuccinate branch and $CaCl_2$) of 1:1, 1:2, and 1:4, from left to right. (c) EDS elemental mapping of a microcapsule particle on a silicon wafer indicating the presence of carbon, oxygen, calcium, sodium and chloride. (d) XPS survey scan of the microcapsule sample. (e) XPS spectra of the Ca 2p region collected from samples of the microcapsule aggregate, the precipitate of the reaction between the MD-OS polymer and $CaCl_2$ (Ca/MD-OS), the precipitate of the reaction between sodium octenylsuccinate (NaOS) and $CaCl_2$), and the pure $CaCl_2$) powder from top to bottom.
Figure 5:
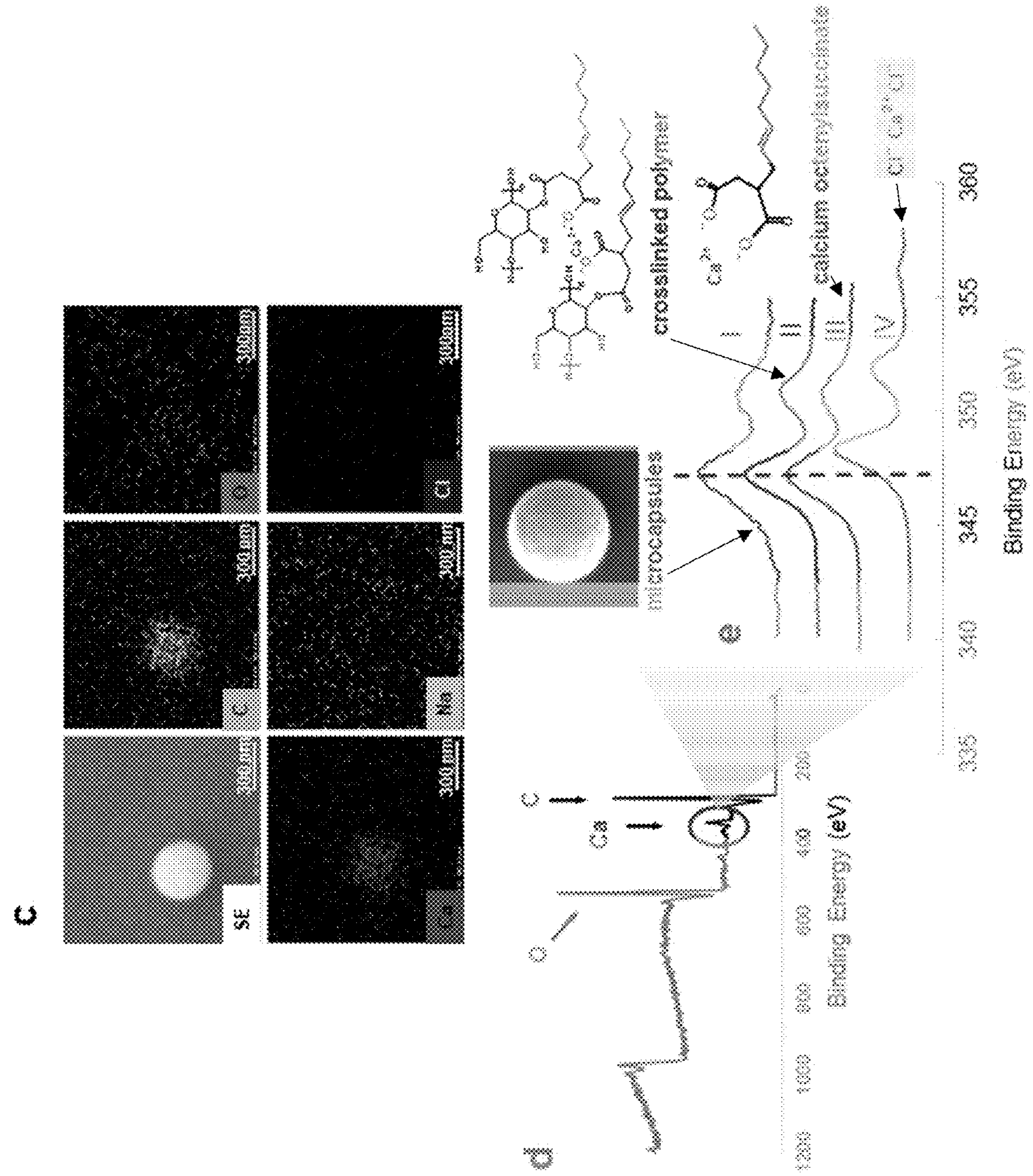

In the crosslinking reaction, the stoichiometric ratio between the OS group and the $Ca^{2+}$ ion is 2:1. However, it was observed that, by adding only half the amount of $CaCl_2$) than MD-OS, it is not sufficient to crosslink and stabilize the microcapsules. Adding $CaCl_2$) at the equivalent of MD-OS showed a better crosslinking performance. To determine the appropriate amount of $CaCl_2$) that needs to be used to enable effective polymer crosslinking and to further understand the reaction between MD-OS and $CaCl_2$), a separate experiment was performed to observe the resulting crosslinking precipitates when MD-OS and $CaCl_2$) were added at different ratios in the water solution without oils. The results suggest that there are two different reaction mechanisms, as shown in FIG. 5*a*. It was hypothesized that the two different products are in the crosslinked and non-crosslinked forms, respectively. It was found that when the mole ratio between the unit of MD-OS and $CaCl_2$) was 1:1 or 1:2, the reactions result in similar amounts of the white crosslinking precipitate. However, when the mole ratio was increased to 1:4, a much less crosslinking precipitate was produced, as shown in FIG. 5*b*, which is an unexpected phenomenon. Adding excess crosslinking agents does not often affect the crosslinking structure or reduce the crosslinking product in other mechanisms. This suggested that by adding an excess amount of $CaCl_2$) the reaction has produced a water-soluble product rather than the crosslinking solid. Without intending to be bound by any particular theory, it is considered that this may be due to the fact that when there is an excess amount of $Ca^{2+}$ ions reacting with the carboxylate salt, only one of the chloride ions of $CaCl_2$) is replaced by a carboxylate ion of the MD-OS polymer chain instead of both chloride ions being replaced by carboxylate ions from different polymer chains to form a polymer crosslinking network, resulting in a non-crosslinked structure which is soluble in water. It was also found that, when the amount of $CaCl_2$) is appropriate and a precipitate is produced, adding additional $CaCl_2$) does not visibly change the amount of solid, suggesting that, additional $CaCl_2$) is not able to dissociate the calcium carboxylate bonding in the network to generate water-soluble polymers. Therefore, both the amount of $CaCl_2$) and the procedure to add the $CaCl_2$) play an important role in the crosslinking efficiency.

When this reaction is applied to the microencapsulation system, due to the limitation of the movement of the polymer chains as they are concentrated at the surface of the microparticles, more $CaCl_2$) must be added to ensure that the $Ca^{2+}$ ions can reach the polymer chains at the dispersed sites to crosslink them. As a result, the crosslinking experiment in emulsion shows that a 1:2 ratio between the OS chain and $CaCl_2$) is appropriate for the reaction.

It was also found that sodium octenylsuccinate, the amphiphilic side product in the synthesis, can react with $CaCl_2$) to form calcium octenylsuccinate, which is not soluble in water. This indicates that the side product in the polymer synthesis can directly participate in the microencapsulation and crosslinking process and finally be incorporated in the network; therefore it does not require additional steps to be removed.

The energy-dispersive X-ray spectroscopy (EDS) results are shown in FIG. 5*c*, which includes the mapping of possible chemical elements on the surface of a microcapsule on a silicon substrate. It clearly shows that, in the polymer shell of the particle, in addition to carbon, there is also calcium present. However, sodium and chloride elements are not evident. This suggested that the sodium ions, paired with carboxylate ions in the MD-OS polymer, are replaced by the calcium ions, which crosslink the polymer chains to create a stable network structure within the polymer shell. All the while, the sodium and chloride ions are dissolved in water and removed from the particles.

To further understand the crosslinking structure, XPS was used to investigate the elemental composition and bonding type of the calcium element in the polymer shell of the microcapsules. The survey scan of the microcapsule sample in FIG. 5*d* indicates that, excluding hydrogen, the polymer shell contains about 70.9% carbon, 26.5% oxygen, and 2.6% calcium. FIG. 5*e* shows the XPS spectra of the Ca 2p region collected from the microcapsule aggregates, the precipitate from the reaction between the MD-OS polymer and $CaCl_2$) (Ca/MD-OS), the precipitate from the reaction between sodium octenylsuccinate and $CaCl_2$) (Calcium octenylsuccinate), and the pure $CaCl_2$) powder, respectively. It was observed that, in the first three spectra, the binding energies of $Ca^2p_{3/2}$ and $Ca^2p_{1/2}$ are all close to 347.3 eV and 350.8 eV, respectively, while in the fourth spectrum of $CaCl_2$ powder, the corresponding binding energies are 348.3 eV and 351.8 eV, respectively. This indicates that calcium forms the same type of chemical bond in the crosslinked microcapsules, Ca/MD-OS precipitate, and calcium octenylsuccinate precipitate, which are different from the chemical bonds that are found in $CaCl_2$. It was noted that the third spectrum in FIG. 5*e* corresponds to calcium octenylsuccinate, the product of the reaction between sodium octenylsuccinate and calcium chloride, in which the calcium ion replaces the sodium ion to form a calcium carboxylate bond. Crosslinked microcapsules and Ca/MD-OS (FIG. 5*e* I and II) show the same binding energy at 347.3 eV and 350.8 eV, which suggests that the bond of calcium in the microcapsules and Ca/MD-OS is also in the form of calcium carboxylate. This demonstrated that, when the MD-OS polymer is solidified by calcium ions at the oil/water interface in the emulsion, a crosslinked polymer network structure resulted from the ionic bonds between calcium ions and the carboxylate groups from different polymer chains.

Figure 6:
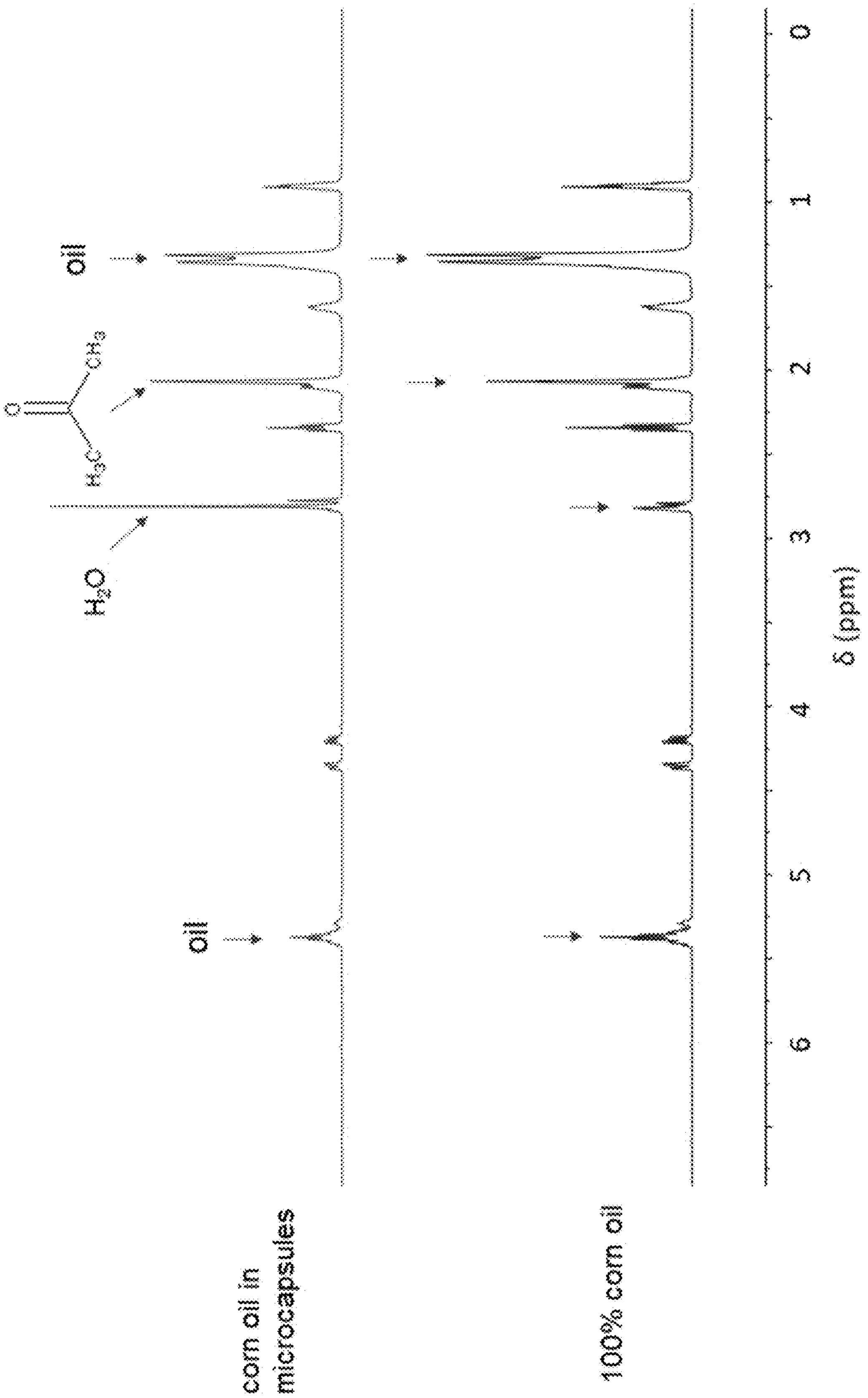
FIG. 6 shows comparison between NMR spectra of the corn oil in microcapsules and pure corn oil dissolved in deuterated acetone for calculation of the loading capacity.
Figure 7:
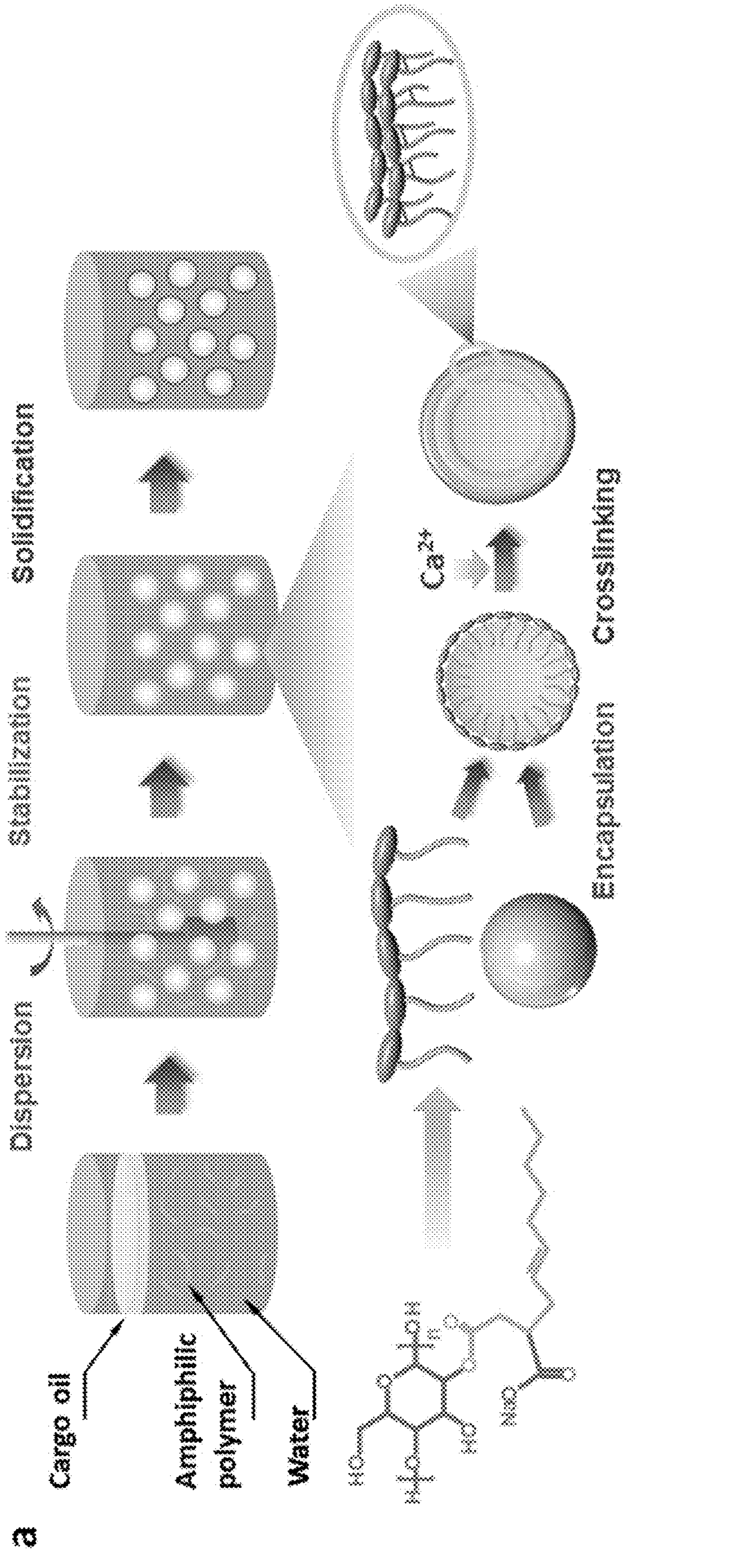
FIG. 7 shows a schematic depicting the formation of a microemulsion of the present disclosure.

In addition, the loading capacity of the microcapsules containing corn oil was studied using quantitative analysis of NMR spectra of the microcapsule sample and the pure oil sample (FIG. 6). The acetone peaks in the two samples were normalized with the same weight. Then the oil peaks between the two samples were compared to obtain the weight of oil in microcapsules. After calculating the water residue contained in microcapsules and deducting it, the weight of microcapsules was obtained and then the loading capacity. For the microcapsules fabricated with a 1:3 ratio between the polymer and oil cargo, it was determined that their loading capacity was 75%, which is close to the theoretical maximum value.

CONCLUSIONS

In summary, a new microencapsulation method based on a microemulsion system that is universally applicable for encapsulating oil-based materials is described herein. In this method, a nature-derived amphiphilic polymer with biodegradable properties was synthesized to address the environmental challenge caused by microcapsules made of non-biodegradable polymers.

A branched polymer was synthesized from MD and OSA at different mole ratios under alkaline conditions, and the reaction mechanism was studied in detail. The molecular structures of the polymers were characterized and analyzed with FTIR and NMR, and the crosslinking mechanism was interpreted based on the EDS and XPS results. A desirable reactant ratio was determined between the glucose unit of MD and OSA in the polymer synthesis process, taking into consideration both the efficiency of the OSA usage and the number of branches attached to the MD chain. In the microencapsulation process, it was found that the branched MD-OS polymer can be crosslinked by calcium ions to create a stable network structure. The EDS results show that the calcium ion replaces the sodium ion in the polymer network. Additionally, XPS indicates the presence of calcium carboxylate bonding within the polymer shell in which the ion acts as a bridge to connect different polymer chains in the network. This new microencapsulation method may provide a facile approach to encapsulate oil-based and oil-soluble core materials such as essential oils, food oils, mineral oil, etc. In addition, the encapsulation process is carried out under ambient conditions, which allows this method to be an ideal candidate for processing volatile core materials such as certain essential oils and fragrance oils.

Although the present disclosure has been described with respect to one or more particular embodiments and/or examples, it will be understood that other embodiments and/or examples of the present disclosure may be made without departing from the scope of the present disclosure.

The invention claimed is:

1. A microcapsule comprising a shell and core, wherein the shell comprises a plurality of amphiphilic polymer units and the core comprises an oil or an oil-based material, wherein at least some of the amphiphilic polymer units are ionically-crosslinked to other amphiphilic polymer units and the amphiphilic polymer unit has the following structure:

(STRUCTURE I)

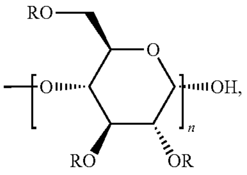

wherein each R is independently (STRUCTURE IA)

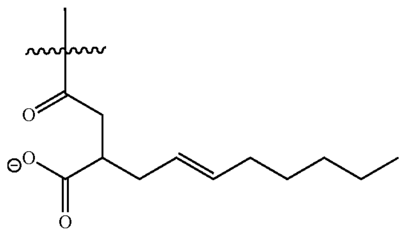

or H, and, at least one R of a glucosyl group of STRUCTURE I of the amphiphilic polymer unit is STRUCTURE IA, and n is 2 to 20, and each of the remaining R groups of STRUCTURE I is H, and wherein the average number of STRUCTURE IA groups to each glucosyl unit of STRUCTURE I is 20%-150%.

2. The microcapsule according to claim 1, wherein the amphiphilic polymer unit has the following structure:

(STRUCTURE II)

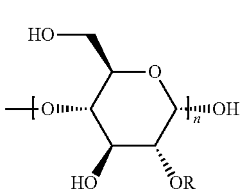

or (STRUCTURE III)

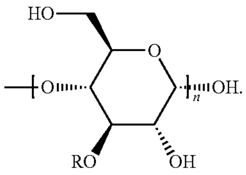

3. The microcapsule according to claim 1, wherein the amphiphilic polymer units are ionically-crosslinked with divalent cations.

4. The microcapsule according to claim 3, wherein the divalent cations are chosen from $Ca^{2+}$, $Zn^{2+}$, $Mg^{2+}$, and combinations thereof.

5. The microcapsule according to claim 3, wherein the mole ratio of STRUCTURE IA to divalent cations is 1:1 to 1:4.

6. The microcapsule according to claim 1, wherein the oil is a volatile oil, a food oil, carrier oil, an essential oil, a mineral oil, or fragrance oil.

7. The microcapsule according to claim 6, wherein the carrier oil is chosen from coconut oil, jojoba oil, apricot kernel oil, sweet almond oil, olive oil, argan oil, rosehip oil, black seed oil, grape seed oil, avocado oil, sunflower oil, corn oil, lemon oil, lavender oil, peppermint oil, and combinations thereof.

8. The microcapsule according to claim 1, wherein the oil is a fragrance oil or comprises one or more fragrance compounds.

9. The microcapsule according to claim 1, wherein the ratio of polymer shell to oil is 1:1 to 1:5.

10. A method for encapsulating an oil or an oil-based material in one or more microcapsules of claim 1, comprising:

preparing a reaction mixture comprising the oil or oil-based material, a plurality of amphiphilic polymer units, and water, wherein the amphiphilic polymer units are STRUCTURE I, wherein each R of STRUCTURE I is independently H or STRUCTURE IA and at least one R of a glucosyl group of STRUCTURE I is STRUCTURE IA, and n of STRUCTURE I is 2 to 20, homogenizing the reaction mixture; and adding a salt comprising a divalent cation to the reaction mixture, wherein the oil or oil-based material is encapsulated in the one or more microcapsule of claim 1 are formed from the amphiphilic polymers and the salt.

11. The method according to claim 10, wherein the divalent cations chosen from $Ca^{2+}$, $Zn^{2+}$, $Mg^{2+}$, and combinations thereof.

12. The method according to claim 10, wherein the mole ratio of STRUCTURE IA to divalent cations is 1:1 to 1:4.

13. The method according to claim 10, wherein the oil is a volatile oil, a food oil, carrier oil, an essential oil, a mineral oil, or fragrance oil.

14. The method according to claim 10, wherein the ratio of polymer shell to oil is 1:1 to 1:5.

15. The method according to claim 10, wherein the average number of STRUCTURE IA groups to each glucosyl unit of STRUCTURE I is 0.2-1.5.

16. A composition comprising a plurality of microcapsules of claim 1 and a carrier.

17. The composition according to claim 16, wherein the carrier is an aqueous carrier.

18. An article comprising a plurality of microcapsules according to claim 1.

19. The microcapsule of claim 1, wherein at least a portion of the amphiphilic polymer units comprise the following the structure:

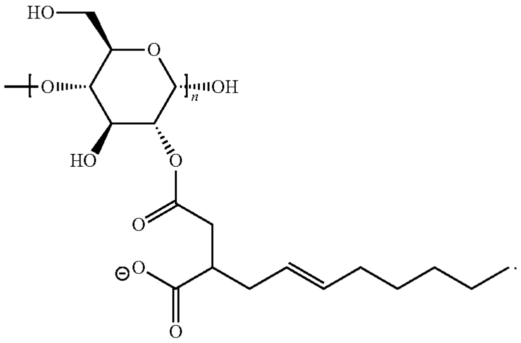

20. The microcapsule according to claim 1, wherein a majority of the microcapsules have a size range of 200-1000 nm.

* * * * *